United States Patent
Linert et al.

(10) Patent No.: US 6,303,190 B1
(45) Date of Patent: Oct. 16, 2001

(54) WATER AND OIL REPELLENT MASONRY TREATMENTS

(75) Inventors: Jeffrey G. Linert, Woodbury; Patricia M. Savu, Maplewood, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/448,629

(22) Filed: Nov. 24, 1999

Related U.S. Application Data

(62) Division of application No. 08/491,232, filed on Jun. 16, 1995, now Pat. No. 6,037,429.

(51) Int. Cl.$^7$ .................................................. B05D 3/02
(52) U.S. Cl. .................... 427/387; 427/384; 427/389; 427/389.9; 427/393.4; 427/393.5; 427/393.6; 427/385.5; 427/407.1; 427/412; 427/422; 428/36.5; 428/421; 428/422; 428/537.5
(58) Field of Search .................... 428/421, 422, 428/36.5, 537.5; 427/384, 387, 389, 389.9, 393.4, 393.5, 393.6, 385.5, 407.1, 412, 422

(56) References Cited

U.S. PATENT DOCUMENTS

| | | | |
|---|---|---|---|
| 3,574,791 | 4/1971 | Sherman et al. | 260/884 |
| 4,517,375 | 5/1985 | Schmidt | 556/463 |
| 4,648,904 | 3/1987 | DePasquale et al. | 106/2 |
| 5,112,393 | 5/1992 | Engel et al. | 106/2 |
| 5,136,000 | 8/1992 | Luttenberger et al. | 526/245 |
| 5,270,378 | 12/1993 | Johnson et al. | 524/520 |
| 5,274,159 | 12/1993 | Pellerite et al. | 556/485 |
| 5,439,998 | * 8/1995 | Lina et al. | 526/243 |

FOREIGN PATENT DOCUMENTS

| | | |
|---|---|---|
| 2099139 | 12/1993 | (CA) . |
| 0 195 714 | 9/1986 | (EP) . |
| 0 408 917 | 1/1991 | (EP) . |
| 0 554 667 | 8/1993 | (EP) . |
| WO 92/07886 | 10/1991 | (WO) . |
| WO 93/01348 | 1/1993 | (WO) . |

OTHER PUBLICATIONS

Mason Hayek "Waterproofing and Water/Oil Repellancy," 24 Kirk–Othmer Encyclopedia of Chemical Technology, pp. 460–62 (3rd ed. 1979).

* cited by examiner

*Primary Examiner*—Judy M. Reddick
(74) *Attorney, Agent, or Firm*—Kent S. Kokko

(57) ABSTRACT

The present invention provides a water-soluble and shelf-stable aqueous fluorochemical polymeric treatment useful to treat porous substrates to render them repellent to water- and oil-based stains. The treatment comprises a water-soluble fluorochemical polymer containing only carbon atoms in the backbone, with a plurality of each of the following groups pendent from the backbone: (a) fluoroaliphatic groups, (b) carboxyl-containing groups, (c) oxyalkylene or polyoxyalkylene groups, and, optionally, (d) silyl groups. Typically, the treatment polymers have interpolymerized units derived from one or more, and preferably a plurality, of each of the following monomers:

(a) monomer selected from the group consisting of acrylate, methacrylate, acrylamide, methacrylamide, thioacrylate or meththioacrylate compounds containing a fluoroaliphatic moiety that is linked to the residue of the compound through a divalent, organic linking group;

(b) monomer selected from the group consisting of acrylic acid, methacrylic acid, carboxyalkylacrylate and carboxyalkylmethacrylate compounds; and (c) monomer selected from the group consisting of acrylate, methacrylate, acrylamide, methacrylamide, thioacrylate or meththioacrylate compounds containing an oxyalkylene or polyoxyalkylene group linked to the residue of the compound through an oxygen, sulfur or nitrogen atom.

13 Claims, No Drawings

WATER AND OIL REPELLENT MASONRY TREATMENTS

This is a divisional application of application Ser. No. 08/491,232, filed on Jun. 16, 1995, now U.S. Pat. No. 6,037,429.

FIELD OF THE INVENTION

This invention relates to water-soluble, soil-resistant and water and oil repellent fluorochemical polymers. More particularly, the present invention relates to the treatment of masonry and other porous substrates with water-soluble fluorochemical polymers to render them resistant to soil and repellent to water- and oil-based stains.

BACKGROUND OF THE INVENTION

Masonry, a term used generically to describe building materials such as concrete, asphalt, brick, tile, stone, grout, and like substances, is used extensively in the construction of buildings, roads, parking ramps, driveways, garage flooring, fireplaces, fireplace hearths, and counter tops. When left unprotected, masonry surfaces quickly discolor from exposure to water- and oil-based stains and gradually deteriorate from spalling and efflorescence induced by water penetration and weather exposure. Common household liquids are among the most severely discoloring stains including motor oil, brake-oil, transmission fluid, cooking oil, coffee, and wine.

Masonry and other porous surfaces may be made resistant to water and water-based liquids in one of two ways: by rendering the surface waterproof or by rendering the surface water repellent. A waterproofed surface is completely impervious to both liquid water and water vapor. A water repellent surface repels water but is substantially permeable to water vapor. Mason Hayek, "Waterproofing and Water/Oil Repellency," 24 Kirk-Othmer Encyclopedia Of Chemical Technology 460–62 (3d ed. 19xx), for example, provides an overview of these effects.

Waterproofing of a surface is typically achieved by application of a membrane such as vinyl chloride, polyvinyl chloride, polyethylene, or butyl rubber or by application of a sealant such as tar, asphalt, paints, polyurethane, epoxy or mastics. While these waterproofing agents can offer excellent resistance to penetration by water and water-based liquids, they often disadvantageously alter the appearance of the coated surface, changing the color of the surface and leaving it with a shine. Waterproofing treatments also trap moisture within the treated surface, thereby promoting spalling.

In contrast, water repellents do not alter the appearance of a porous masonry surface when applied as a treatment, and because a water repellent surface is permeable to water vapor, moisture does not become trapped in the masonry and spalling effects can be reduced. Water-repellent treatments used commercially include metal stearates, oils, waxes, acrylates (both polymers and monomers), silicones (solvent-based and emulsion), siliconates, silanes and, more recently, fluorochemicals. These compositions generally contain hydrophobic groups, such as a long-chain alkyl group or polydimethylsiloxane, and functional groups, such as silyl or carboxyl, to bond either covalently or ionically to the masonry surface, which typically contains high concentrations of silicon, calcium and aluminum atoms. Treatments made from these compositions are typically delivered from volatile organic solvents, which are undesirable because of the adverse environmental and health effects associated with them.

Environmental concerns have spawned the development of a number of water-dispersed and water-emulsified masonry treatments. U.S. Pat. No. 4,648,904 (DePasquale et al.), for example, describes a shelf-stable aqueous emulsion useful to render a porous ceramic substrate water-repellent consisting essentially of a $C_1$–$C_{20}$ hydrocarbyl or halogenated hydrocarbyl silane and a nonionic emulsifying agent having a hydrophillic-lipophilic balance (BLB) value from 4 to 15. Also, U.S. Pat. No. 4,517,375 (Schmidt) discloses aqueous impregnation solutions prepared from hydrolyzed alkyl trialkoxy silanes. While providing ecological advantages over solvent-based treatments, these water-dispersed and water-emulsified silane materials have not been evidenced to provide performance comparable to solvent delivered materials. Additionally, silane compositions do not provide significant protection from oil-based stains.

Only fluorochemical-containing treatments offer significant repellency to oil-based stains. U.S. Pat. No. 5,274,159 (Pellerite et al.), for example, describes certain water-soluble or dispersible fluorocarbylalkoxysilane surfactants which may be cured onto a masonry surface. Additionally, Published World Patent Application WO 9207886 describes an aqueous dispersion of a gelled particulate fluororesin that can form a protective film having good weatherability and good stain-resistance.

SUMMARY OF THE INVENTION

In one aspect, the present invention provides a water-soluble and shelf-stable aqueous fluorochemical polymeric treatment useful to treat porous substrates to render them repellent to water- and oil-based stains. The treatment comprises a water-soluble fluorochemical polymer containing only carbon atoms in the backbone, with a plurality of each of the following groups pendent from the backbone: (a) fluoroaliphatic groups, (b) carboxyl-containing groups, (c) oxyalkylene or polyoxyalkylene groups, and, optionally, (d) silyl groups. Typically, the treatment polymers have interpolymerized units derived from one or more, and preferably a plurality, of each of the following monomers:

(a) monomer selected from the group consisting of acrylate, methacrylate, acrylamide, methacrylamide, thioacrylate or meththioacrylate compounds containing a fluoroaliphatic moiety that is linked to the residue of the compound through a divalent, organic linking group;

(b) monomer selected from the group consisting of acrylic acid, methacrylic acid, carboxyalkylacrylate and carboxyalkylmethacrylate compounds; and (c) monomer selected from the group consisting of acrylate, methacrylate, acrylamide, methacrylamide, thioacrylate or meththioacrylate compounds containing an oxyalkylene or polyoxyalkylene group linked to the residue of the compound through an oxygen, sulfur or nitrogen atom.

Preferably, the polymer further includes interpolymerized units derived from monomers selected from the group consisting of acrylate, methacrylate, acrylamide, methacrylamide, thioacrylate and meththioacrylate compounds that contain a alkoxysilane moiety linked to the residue of the monomer through a divalent organic group. In another aspect, the present invention provides shelf-stable aqueous solutions or dispersions comprising the polymeric treatment and a method of treating porous substrates to render them repellent to water- and oil-based stains using the aforementioned polymeric product.

Because the water-soluble polymeric treatment of the present invention, and the shelf-stable aqueous solutions thereof, can be applied to porous substrates in aqueous solution, they eliminate the need for environmentally harmful and toxic co-solvents. Particularly when applied to masonry and other siliceous materials, these polymeric treatments can react with the substrate onto which they are applied to form an invisible and water-insoluble coating that repels both water and oil, resists soiling, and that cannot be easily washed from the surface of the substrate. Substrates treated with these polymers are thereby durably protected from rain and normal weathering.

DETAILED DESCRIPTION OF INVENTION

The water-soluble, fluorochemical polymeric treatments useful in the invention comprise compounds that comprise water-soluble fluorochemical polymers containing only carbon atoms in the backbone, with a plurality of each of the following groups pendent from the backbone: (a) fluoroaliphatic groups, (b) carboxyl-containing groups, (c) oxyalkylene or polyoxyalkylene groups, and, optionally silyl groups.
Typically, usefull treatment polymers comprise interpolymerized units derived from each of the following monomers:

(a) monomer selected from the group consisting of acrylate, methacrylate, acrylamide, methacrylamide, thioacrylate or meththioacrylate compounds which contain a fluoroaliphatic moiety that is linked to the residue of the compound through an organic, divalent linking group;

(b) monomer selected from the group consisting of acrylic acid, methacrylic acid, carboxyalkylacrylate and carboxyalkylmethacrylate compounds; and (c) monomer selected from the group consisting of acrylate, methacrylate, acrylamide, methacrylamide, thioacrylate or meththioacrylate compounds that contain an oxyalkylene or polyoxyalkylene group.

Other monomers may also be used to prepare the polymeric treatment, that do not interfere with the water-solubility or the water and oil repellent properties of the product. Preferably the only monomer used in addition to monomers (a), (b) and (c) to prepare the product is monomer selected from the group consisting of acrylate, methacrylate, acrylamide, methacrylamide, thioacrylate and meththioacrylate compounds and containing an alkoxysilane moiety linked to the residue of the monomer through a divalent organic group. Preferably, a plurality of units derived from each of the aforementioned monomers are present in the polymer and the units can be located randomly or in blocks or segments along the backbone of the polymer.

Preferably, the polymeric treatment comprises a polymer that can be represented by the following general formula:

$R_f$ represents a fluoroaliphatic group having a perfluorinated carbon chain from about 3 to about 20 carbon atoms in length, more preferably having from about 6 to about 14 carbon atoms. $R_f$ can contain straight chain, branched chain, or cyclic fluorinated alkylene groups, or any such combination thereof $R_f$ is preferably free of polymerizable olefinic unsaturation and can optionally contain caternary heteroatoms such as oxygen, divalent or hexavalent sulfur, or nitrogen. A fully fluorinated radical is preferred, but hydrogen or chlorine atoms may be present as substituents provided that not more than one atom of either is present for every two carbon atoms. It is preferred that $R_f$ contains about 40% to about 80% fluorine by weight, more preferably about 50% to about 78% fluorine by weight. The terminal portion of the $R_f$ group is fully fluorinated, preferably containing at least 7 fluorine atoms, e.g., $CF_3CF_2CF_2-$, $(CF_3)_2CF-$, $-CF_2SF_5$ or the like. Perfluorinated aliphatic groups (i.e., those of the formula $C_nF_{2n+1}-$) are the most preferred embodiments of $R_f$.

$R^1$ represents an organic divalent connecting group having from 1 to 12 carbon atoms and is preferably $-C_yH_{2y}-$, $-CON(R)^5)C_yH_{2y}-$, $-SO_2N(R^5)C_yH_{2y}-$, or $-C_yH_{2y}SO_2N(R^5)C_yH_{2y}-$, where $R^5$ is hydrogen, methyl, ethyl, propyl, and butyl and y is independently selected from 1 to 6, preferably from 2 to 4;

X is independently selected as oxygen, nitrogen, or sulfur. Preferably, X is oxygen or nitrogen;

$R^2$ is a short chain alkylene group, such as methylene or ethylene;

m is either 0 or 1.

$M^+$ is $NH_4^+$, $NR_nH_{4-n}^+$, where R is an alkyl, aryl or alkylaryl group and where n may be between 0 and 4 inclusive, or $M^+$ is an alkali metal cation, or is a multivalent cation that does not adversely affect the water solubility of the polymer, such as Ca and Zn.

$R_{OA}$ is an oxyalkylene or a polyoxyalkylene group of the formula $-(C_2H_4O)_p(C_3H_6O)_q(C_4H_8O)_rR^6$ where $R^6$ is hydrogen or an alkyl or aryl group having from 1 to 4 carbon atoms and where p, q, or r can be zero, but their sum, p+q+r, must be a number greater than or equal to 1. The maximum value of p+q+r will depend upon the value of c (the amount of oxyalkylene-containing monomer unit present in the polymer), and the value p+q+r and c are selected such that the polymeric product is water-soluble. Typically, p+q+r will be from about 2 to about 200. Preferably, $R_{OA}$ is a hydroxypropyl group or contains a polyoxyethylene (I)

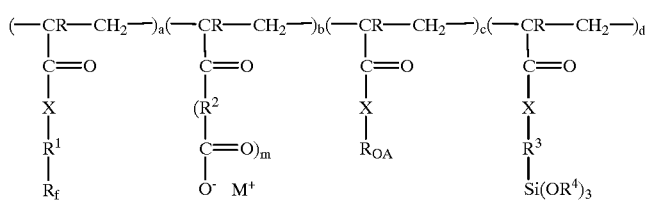

wherein:

R is hydrogen or an aliphatic hydrocarbon group having from 1 to 4 carbon atoms;

chain or a polyoxyalkylene chain consisting of interpolymerized oxyethylene and oxypropylene units.

$R^3$ represents an organic divalent connecting group having from 1 to 4 carbon atoms and is preferably —CH$_2$—, —C$_2$H$_4$—, —C$_3$H$_6$— or —C$_4$H$_8$—.

$R^4$ is selected from the group consisting of hydrogen, methyl, ethyl, propyl, and butyl.

The coefficients a, b, c, and d of Formula I represent the number of interpolymerized monomer units for each monomer present in the polymer. Because the presence of the silyl-containing monomer in the polymer, though referred, is optional, the coefficient d as depicted in Formula I may be zero. The ratio of the constituent monomers in the polymer, reflected by the coefficients a, b, c, and d, should be chosen to meet the following polymer requirements:

(1) a polymer number average molecular weight ($M_n$) of from about 3500 to about 30,000, preferably from about 4500 to about 20,000;

(2) a molecular weight distribution, $M_w/M_n$, of greater than 1.5 preferably greater than 2;

(3) from about 40% to about 80% by weight, preferably from about 50% to about 70% by weight, of interpolymerized monomer units with pendent fluoroaliphatic groups;

(4) from about 5% to about 50% by weight, preferably from about 5% to about 25% by weight, of interpolymerized monomer units with pendent carboxyl functional groups;

(5) from about 5% to about 50% by weight, preferably from about 5% to about 35% by weight, of interpolymerized monomer units with pendent oxyalkylene-containing functional groups; and (6) from 1% to about 20% by weight, preferably from about 2% to about 15% by weight, of interpolymerized monomer units with pendent silyl-containing functional groups, if such monomer units are present.

Representative fluoroaliphatic group-containing monomers useful for making the polymers depicted by Formula I include the following:

$C_8F_{17}SO_2N(CH_3)C_2H_4OC(O)CH=CH_2$;
$C_8F_{17}SO_2N(C_2H_5)C_2H_4OC(O)CH=CH_2$;
$C_8F_{17}SO_2N(C_2H_5)C_2H_4OC(O)C(CH_3)=CH_2$;
$C_8F_{17}SO_2N(C_4H_9)C_2H_4OC(O)CH=CH_2$;
$C_8F_{17}CH_2CH_2OC(O)CH=CH_2$;
$C_7F_{15}CH_2OC(O)CH=CH_2$; and the reaction product of one mole each of $C_8F_{17}SO_2N(C_2H_5)C_2H_4OH$, $HOC_3H_6OC(O)C(CH_3)=CH_2$ and toluene diisocyanate.

Representative carboxyl group-containing monomers useful for making the polymer depicted by Formula I include acrylic acid, methacrylic acid and carboxyethylacrylate.

Representative oxyalkylene group-containing monomers useful for making the polymer depicted by Formula I include the following:

$HOCH_2CH_2OC(O)CH=CH_2$,
$HOCH_2CH_2OC(O)C(CH_3)=CH_2$,
$HOC_3H_6OC(O)CH=CH_2$, and
$CH_3O(CH_2CH_2CH_2O)_{17}C(O)CH=CH_2$, and
$HO(C_2H_4O)_{10}(C_3H_6O)_{22}(C_2H_4O)_{10}C(O)CH=CH_2$, each a polyoxyethylene group-containing monomer.

Representative silyl group-containing monomers useful for making the polymer depicted in Formula I include 3-acryloxypropyl trimethoxysilane, 3-methacryloxypropyl trimethoxysilane, and vinyltriethoxysilane.

The polymerization reaction to create the polymeric treatments of this invention may be carried out in a solvent (e.g., acetone, ethyl acetate, isopropyl alcohol, tetrahydrofuran or methylene chloride) or in a solvent blend in the presence of little or no water using from 0.5 to 2.0 weight percent of a standard free radical polymerization initiator such as t-butylperoctoate (t-BPO) or 2,2'-azobisisobutyronitrile based on the weight of the monomers employed. Optionally, 2 to 5 weight percent based on the weight of the monomers of a standard chain transfer agent such as isooctylthioglycolate (IOTG) or preferably a silane- or silanol-containing chain transfer agent such as 3-mercaptopropyltrimethoxysilane (MPTS) may also be used. The use of a chain transfer agent is not necessary in a solvent such as THF which itself provides chain transfer properties, but is necessary in a low free radical-containing solvent such as ethyl acetate to prevent the molecular weight from becoming excessively high and resulting polymers too viscous.

After the polymerization is complete, the acidic copolymer solution or dispersion is neutralized with water containing a base, preferably ammonium hydroxide, to form an emulsion. The solvent or solvents used in the reaction may then be stripped under vacuum to form a clear aqueous solution of the polymer without the need for external emulsifiers. During neutralization, any pendent silane groups, if present, hydrolyze to form free silanol groups. These groups will not self-crosslink to destabilize the aqueous polymer solution but will instead increase the polymer's water solubility. Surprisingly, aqueous solutions of the resulting silanol group-containing polymers are indefinitely shelf stable at room temperature. The presence of the silanol groups within the polymeric treatment additionally allows the polymer to covalently react with a siliceous masonry surface, thereby improving durability of the treatment.

Aqueous solutions of the polymers of the present invention may be applied onto any porous substrate into which a liquid may imbibe, including masonry, textiles, carpets, plastics, painted surfaces, and leathers, to render that substrate resistant to soiling and repellent to water- and oil-based stains. Any method of application which produces a thin coating of the polymer on the substrate surface may be used, such as by spraying, padding, or painting. Once applied from solution, the polymer treatments may be dried onto the substrate either under ambient conditions or at elevated temperatures to produce a long-lasting repellent surface that does not change the appearance of the masonry. Application of a small amount of a multivalent hydroxide, e.g. calcium hydroxide, may also be added to a dilute aqueous solutions of the polymer prior to application of the treatment to a polished surface to facilitate the removal of excess coating from the surface. As a result of the penetration of the polymer treatments into the porous substrate surface, these treatments generally additionally prevent adsorption of staining fluids into the substrate (i.e., fluids will not soak in), even after extensive outdoor exposure, since the coating below the surface is not degraded.

The following examples are offered to aid in a better understanding of the present invention and are not to be unnecessarily construed as limiting the scope thereof.

EXAMPLES

Test Methods

The test methods used to evaluate the performance described in Examples and Comparative Examples infra are described below.

Cement Tile Preparation, Treatment Application

Cement tiles of 30 cm length by 10 cm width by 1 cm thickness were prepared from concrete (or mortar) according to the procedure described in ASTM C 109-92, Section 10, but without tamping. The wet cement surface of each tile was given a broom finish prior to curing. Each tile was allowed to cure for at least two weeks at ambient conditions prior to testing. For testing, each cured tile was divided into either 7 sections (each 4 cm by 9 cm) or 9 sections (each 3 cm by 9 cm) with a dividing product (Plastic Dip™ coating, made by PDI Inc., Circle Pines, Minn.). The desired treatment was applied and spread evenly with an eyedropper one time to only one side of a cured tile section at a spreading rate of 160 square feet per gallon, or 40 cm$^2$/g (0.92 g for a 4 cm by 9 cm section or 0.67 g for a 3 cm by 9 cm section). Each treated tile was allowed to dry for at least 12 hours under ambient laboratory conditions.

Scrubbing Test to Measure Durability

To determine the treatments durability, the following scrubbing test was used. A detergent solution was prepared consisting of 60 g Dawns liquid dishwashing soap mixed with 940 g tap water. Each treated cement tile had its dividing product removed and was mentally divided into lengthwise halves: one half was left as is, and the other half was scrubbed. The scrubbed half was first contacted with water, then with about 2 mL of detergent solution. The wet surface was scrubbed back and forth three times with a 12 cm by 3 cm stiff nylon bristle brush held lengthwise, then was rinsed with water. The scrubbing and rinsing procedures on the half were repeated two more times, and the tile was allowed to dry under ambient conditions.

Water Absorption Test (WAT)

A Rilem tube was used to measure the resistance of a treated cement tile to penetration by a hydrostatic head of water (the pressure on the tile is directly proportional to the height of water in a Rilem tube). This test was adapted from Rilem (Commission—2.5 Test Method II.4).

A Rilem tube, having a height of 7 inches (18 cm), a base diameter of 2.5 cm and an upper section with a diameter of 1 cm and a graduated volume scale of 10 mL, was attached to either the scrubbed or the unscrubbed tile half using 3M Press-In-Place™ Caulk. The tube was filled with sufficient water to bring the water level 8.0 cm above the substrate surface and a water volume reading was taken. After 20 minutes, a new water volume reading was taken and the number of milliliters of water absorbed by the treated tile was calculated by subtracting the two readings. The Water Absorption Value reported is ten times the number of milliliters of water absorbed (e.g., if 0.5 mL of water were absorbed, the Water Absorption Value would be 5).

Spot Test

A Spot Test was used to visually rate the ability of the treated cement tile to prevent a test fluid drop from staining the cement after a given exposure period, both before and after scrubbing.

Scrubbed and unscrubbed treated sectioned cement tiles were challenged with 0.1 mL drops of the following stains:

DOT 3 motor vehicle brake fluid (conforms to Fed. Standard 116; Fed. Specification U-V-6801 & SAE J1703) with added FDC Color Blue #1 dye (BFL)

Paul Masson™ burgundy wine (WIN)

Hot bacon grease; Corn King™ Bacon, cooked, grease recovered, preheated to 110° C. (HBG)

Pennzoil™ ATF Automatic transmission fluid (ATF)

Hokan™ sesame seed oil (SSO)

Water saturated with Taster's Choice™ coffee (COF)

Used 10W30 motor oil (taken from a 1980 Buick Skylark, 5,000 mi.) (UMO)

After 16 hours, the drops were removed by using the aforementioned scrubbing and rinsing procedure.

The following 5-point scale was used to rate the Spot Test performance of the treatment on the scrubbed and unscrubbed tile surfaces, 0 representing the best rating:

0=no visible stain

1=trace of stain visible

2=outline of drop barely visible

3=outline of drop visible

4=dark outline of drop

5=dark stain which has spread

Total Rating

The Total Rating is the sum of the Water Absorption rating and Spot Test ratings and represents an overall repellency rating for that particular treatment when applied to a concrete tile.

Weather-O-Meter Test

One set of treated cement tiles was given an accelerated weathering test as described in test procedure ASTM G-26, with a Type B exposure apparatus. The testing equipment was a water-cooled Atlas™ ARC, Model 65XWWR or CI 65 (available from Atlas Electric Devices Co.), containing a 6500 watt xenon light source with borosilicate inner and outer filters, giving an irradiance of 0.35 w/m$^2$. Test samples were exposed for 168 hours to repeating cycles of 102 minutes of light at black-panel temperature 63±3° C. followed by 18 minutes of light with water spray at temperature 16±5° C.

Preparations of Polymers Evaluated

A list of acronyms for the monomers, initiators and chain-transfer agents used to make the polymers evaluated as masonry treatments is presented in Table 1.

TABLE 1

| | Full Name or Structure |
|---|---|
| Monomer | |
| MeFOSEA | $C_8F_{17}SO_2N(CH_3)C_2H_4OC(O)CH=CH_2$ (can be made by reacting $C_8F_{17}SO_2F$, available from 3M Co. as Fluorad ™ Fluorochemical Intermediate FX-8, with N-methyl-2-aminoethanol to form $C_8F_{17}SO_2N(CH_3)C_2H_4OH$, which is further reacted with acryloyl chloride) |
| EtFOSEA | $C_8F_{17}SO_2N(C_2H_5)C_2H_4OC(O)CH=CH_2$ (available from 3M as Fluorad ™ Fluorochemical Acrylate FX-13) |
| TelomerA | $C_8F_{17}C_2H_4OC(O)CH=CH_2$ (made by reacting Zonyl ™ BA, fluorochemical alcohol, available from DuPont, with acryloyl chloride) |
| A-174 | 3-methacryloxypropyl trimethoxysilane (available from Union Carbide) |
| AA | acrylic acid |
| CEA | β-carboxyethyl acrylate |
| CW450A | $CH_3O(CH_2CH_2O)_{10}C(O)CH=CH_2$ (made by reacting Carbowax ™ 450, a 450 molecular weight monofunctional polyethylene oxide available from Union Carbide, with acryloyl chloride) |
| CW750A | $CH_3O(CH_2CH_2O)_{17}C(O)CH=CH_2$ (made by reacting Carbowax ™ 750, a 750 molecular weight monofunctional polyethylene oxide available from Union Carbide, with acryloyl chloride) |
| BA | n-butyl acrylate |
| IOA | isooctyl acrylate |
| HPA | β-hydroxypropyl acrylate |
| Initiator | |
| AIBN | 2,2'-azobisisobutyronitrile (available from DuPont as Vazo ™ 64 initiator) |
| TBPO | t-butyl peroctoate (available from Atochem North America, Inc.) |
| Chain Trans. Agent | |
| IOTG | isooctylthioglycolate (available from Hampshire Chemical Corp, Lexington, Mass.) |

TABLE 1-continued

| | Full Name or Structure |
|---|---|
| MPTS | 3-mercaptopropyltrimethoxysilane (available from Hüls America, Inc.) |

Preparation of Polymer P1

A 4-ounce (113 g) narrow-mouth bottle was charged with 13 g of MeFOSEA, 1 g of A-174, 2 g of AA, 4 g of CW750A, 0.4 g (2%) of TBPO initiator, and 30 g of tetrahydrofuran (THF) to make a polymer with a theoretical monomer weight ratio of 65/5/10/20 MeFOSEA/A-174/AA/CW750A. The bottle was purged with nitrogen for approximately 5 minutes, was sealed, and then was heated with agitation in a water bath at 65° C. for 4–5 hours, After that time, 30 g of the resulting polymer solution was mixed with 50 g of water and 2 g of 28% aqueous $NH_4OH$. The neutralized polymer solution was distilled at a pressure of approximately 300 mm Hg, with THF coming off at 30–35° C., initiator by-product and water coming off at 35–60° C., and water coming off at 60° C. Distillation continued until only water was coming off and the neutralized polymer solids in the remaining water had formed a fluid, relatively clear aqueous concentrate of between 20 and 40% solids by weight. This concentrate was diluted to 3% (wt) solids with water to form a clear aqueous premix solution to be used for the masonry treatment tests.

Preparation of Polymers P2–P9

Polymers P2–P9 were made in iBF in the same way as was Polymer P1 in Example 1 except that the charges of MeFOSEA, A-174, AA and CW750A were varied as shown in Table 2.

TABLE 2

| | MeFOSEA/A-174/AA/CW750 Charges | |
|---|---|---|
| Polymer | (grams) | (theo. wt % of polymer) |
| P2 | 12.4/1.0/1.0/5.6 | 62/5/5/28 |
| P3 | 13.0/1.0/3.0/3.0 | 65/5/15/15 |
| P4 | 13.0/1.0/4.0/2.0 | 65/5/20/10 |
| P5 | 13.0/1.0/2.0/3.0 | 70/5/10/15 |
| P6 | 13.0/2.0/1.5/3.5 | 65/10/7.5/17.5 |
| P7 | 13.0/3.0/1.5/3.5 | 60/15/7.5/17.5 |
| P8 | 11.0/4.0/1.5/3.5 | 55/20/7.5/17.5 |
| P9 | 13.6/0.0/2.0/4.4 | 68/0.0/10/22 |

For Polymers P2–P9, 20–40% aqueous concentrates and 3% aqueous premix solutions were all fluid and relatively clear, representing monomer weight percentages ranges of 55% to 70% for MeFOSEA, 0% to 20% for A-174, 5% to 20% for AA, and 10% to 28% for CW750A.

Preparation of Comparative Polymer CP1

Comparative Polymer CP1 was made in the same way as was Polymer P1 in Example 1 except that the charge of MeFOSEA was 13.0 g, A-174 was 1.0 g, AA was 6.0 g and CW750A was omitted, giving a polymer with a theoretical monomer weight ratio of 65/5/30 MeFOSEA/A-174/AA. This polymer gelled during the polymerization at 65° C., making it useless as a masonry treatment, thus showing the adverse effect of omitting the oxyalkylene group-containing monomer from the polymer.

Preparation of Comparative Polymer CP2

Comparative Polymer CP2 was made in the same way as was Polymer P1 in except that the charge of MeFOSEA was 13.0 g, A-174 was 1.0 g, CW750A was 6.0 g and AA was omitted, giving a polymer with a theoretical monomer weight ratio of 65/5/30 MeFOSEA/A-174/CW750A. Though the resulting polymer formed a fluid solution in tetrahydrofuran during the polymerization at 65° C., the aqueous solution did not clear up upon removal by distillation of the THF, initiator by-product, and some water. When the concentrated was diluted to 3% (wt) solids with water, a precipitate formed, which is undesirable for a shelf-stable masonry treatment. These results show the adverse effect of omitting the carboxyl group-containing monomer from the fluorochemical polymer of this example.

Examples 1–9

In Examples 1–9, Polymers P1–P19 were applied as 3% (wt) solids aqueous premix solutions to cement tiles to determine the effect of varying the concentration of fluoroaliphatic group-containing monomer, carboxyl group-containing monomer, polyoxyalkylene group-containing monomer and silyl group-containing monomer in the polymer. Results from these treated cement tile tests are presented in Table 3. For the water penetration and stain resistance test data, the number presented before the slash was measured on unscrubbed treated tile, while the number presented after the slash was measured on scrubbed treated tile.

Comparative Example C1

In Comparative Example C1, a commercially used fluorochemical-based repellent emulsion, Scotchgard™ FC-364 Carpet Protector, was diluted to 3% (wt) solids with water and was applied to a section of a cement tile and evaluated as described in Examples 11–20. Table 3 presents the results.

TABLE 3

| | | Results of Water and Stain Tests | | | | | | | | |
|---|---|---|---|---|---|---|---|---|---|---|
| Ex. | Polymer | WAT | BFL | WIN | HBG | ATF | UMO | SSO | COF | TOTAL |
| 1 | P1 | 0/1 | 1/2 | 3/3 | 1/3 | 1/3 | 2/4 | 1/3 | 3/3 | 12/22 |
| 2 | P2 | 1/1 | 3/3 | 2/3 | 0/3 | 0/3 | 0/4 | 0/4 | 3/3 | 9/24 |
| 3 | P3 | 1/1 | 1/2 | 1/3 | 0/3 | 0/3 | 2/4 | 0/2 | 3/3 | 8/21 |
| 4 | P4 | 1/1 | 3/2 | 1/3 | 0/3 | 0/3 | 2/4 | 1/4 | 2/3 | 10/23 |
| 5 | P5 | 1/2 | 2/2 | 2/3 | 0/2 | 1/3 | 0/2 | 1/1 | 2/3 | 9/18 |
| 6 | P6 | 1/2 | 2/3 | 3/4 | 1/3 | 1/3 | 2/3 | 1/2 | 2/3 | 13/23 |
| 7 | P7 | 0/1 | 2/3 | 2/4 | 1/3 | 2/3 | 1/3 | 1/3 | 2/2 | 11/22 |
| 8 | P8 | 11/11 | 4/4 | 1/1 | 1/3 | 4/5 | 1/2 | 1/3 | 2/4 | 25/33 |
| 9 | P9 | 1/2 | 3/2 | 1/3 | 0/2 | 1/3 | 0/2 | 0/2 | 2/3 | 8/20 |
| C1 | FC-364 | 4/4 | 4/4 | 3/3 | 4/4 | 3/5 | 3/3 | 2/4 | 3/4 | 26/31 |

The data of Table 3 show that the polymers of this invention all performed the FC-364 as a durable water and oil resistant masonry repellent. Polymer P9, containing no pendent silyl groups, performed comparably to Polymers P1–P8, which do contain pendent silyl groups, indicating that the presence of pendent silyl groups in the polymer is not required to attain a durable treatment resistant to water penetration and to staining.

Preparation of Polymers P10–P15

Polymers P10–P15 were made in THF using the same monomers, the same theoretical monomer ratios and the same bottle polymerization procedure as described to make Polymer P1 but the molecular weights of the polymers were varied by incorporating various levels of initiator and chain-transfer agent. Number average molecular weights ($M_n$) and weight average molecular weights ($M_W$) of the polymers were determined by gel permeation chromatography using a polystyrene standard. The acidic polymers were then neutralized in aqueous $NH_4OH$ using the procedure as with Polymer P1 and the THF was stripped away, giving aqueous concentrates containing the neutralized polymer at 40–50 (wt) % solids. These concentrates were then diluted to 3% (wt) solids with water to form aqueous premix solutions to be used for the masonry treatment tests.

Preparation of Polymer P10

Polymer P10 was prepared by charging 13 g MeFOSEA, 1 g MPTS (using 5% 3-mercaptotrimethoxysilane as both silane constituent and chain-transfer agent), 2 g AA and 4 g CW750A. The number average molecular weight of the polymer was determined to be 3500, with an $M_w/M_n$ ratio of 1.574.

The aqueous concentrate resulting from the neutralization and THF strip steps was fluid and nearly clear. Diluting the concentrate to 3% (wt) solids with water formed a clear aqueous premix solution initially free of any precipitate, and after 48 hours formed a slight precipitate.

Preparation of Polymer P11

Polymer P11 was prepared by charging 13 g MeFOSEA, 1 g A-174, 2 g AA, 4 g CW750A and 0.4 g (2%) MPTS. The number average molecular weight of the polymer was determined to be 5460, with an $M_w/M_n$ ratio of 2.134.

The aqueous concentrate resulting from the neutralization and THF strip steps was fluid and nearly clear. Diluting the concentrate to 3% (wt) solids with water formed a clear aqueous premix solution initially free of any precipitate, and after 48 hours formed a slight precipitate.

Preparation of Polymer P12

Polymer P12 was prepared by charging 13 g MeFOSEA, 1 g A-174, 2 g AA, 4 g CW750A and 0.1 g (0.5%) TBPO initiator. The number average molecular weight of the polymer was determined to be 6300, with an $M_w/M_n$ ratio of 4.72.

The aqueous concentrate resulting from the neutralization and THF strip steps was fluid and nearly clear. Diluting the concentrate to 3% (wt) solids with water formed a clear aqueous premix solution free of any precipitate.

Preparation of Polymer P13

Polymer P13 was prepared using the same procedure as with Polymer P12 except that 0.2 g (1%) TBPO initiator was used. The number average molecular weight of the polymer was determined to be 7560, with an $M_w/M_n$ ratio of 4.39.

The aqueous concentrate resulting from the neutralization and TBF strip steps was fluid and nearly clear. Diluting the concentrate to 3% (wt) solids with water formed a clear aqueous premix solution free of any precipitate.

Preparation of Polymer P14

Polymer P14 was prepared using the same procedure as with Polymer P12 except that 0.4 g (2%) TBPO initiator was used. The number average molecular weight of this polymer was determined to be 7771, with an $M_w/M_n$ ratio of 5.11.

The aqueous concentrate resulting from the neutralization and THF strip steps was fluid and nearly clear. Diluting the concentrate to 3% (wt) solids with water formed a clear aqueous premix solution free of any precipitate.

Preparation of Polymer P15

Polymer P15 was prepared using the same procedure as with Polymer P12 except that 0.4 g (2%) TBPO initiator was used and 0.4 g (2%) of IOTG chain-transfer agent was added. The number average molecular weight of this polymer was determined to be 5500, with an $M_w/M_n$ ratio of 2.2.

The aqueous concentrate resulting from the neutralization and THF strip steps was fluid and nearly clear. Diluting the concentrate to 3% (wt) solids with water formed a clear aqueous premix solution free of any precipitate.

Examples 10–15

In Examples 10–15, Polymers P10–P15 were applied as 3% (wt) solids aqueous premix solutions to cement tiles to determine the effect on water and stain resistance of varying the molecular weight of the polymer. Results from these treated cement tile tests are presented in Table 4. Again, as in Table 3, the number presented before the slash was measured on unscrubbed treated tile, while the number presented after the slash was measured on scrubbed treated tile.

TABLE 4

| | | | Results of Water and Stain Tests | | | | | | | | |
|---|---|---|---|---|---|---|---|---|---|---|---|
| Ex. | Polymer | Mol. Wt. | WAT | BFL | WIN | HBG | ATF | UMO | SSO | COF | TOTAL |
| 10 | P10 | 3500 | 4/9 | 1/4 | 2/3 | 0/3 | 2/5 | 0/3 | 0/4 | 2/3 | 11/34 |
| 11 | P11 | 5460 | 0/2 | 0/1 | 1/3 | 0/2 | 0/2 | 0/3 | 0/2 | 2/2 | 3/17 |
| 12 | P12 | 6300 | 0/3 | 1/4 | 2/3 | 0/2 | 0/3 | 0/3 | 0/4 | 2/3 | 5/25 |
| 13 | P13 | 7560 | 0/2 | 0/1 | 3/3 | 1/1 | 0/2 | 1/3 | 1/2 | 2/2 | 8/16 |
| 14 | P14 | 7771 | 1/2 | 1/1 | 3/2 | 1/1 | 1/2 | 1/2 | 0/2 | 2/2 | 10/14 |
| 15 | P15 | 5500 | 0/2 | 1/1 | 2/3 | 0/2 | 4/4 | 0/3 | 0/3 | 3/3 | 10/21 |

Results from Table 4 show that good resistance to water penetration and staining was attained with all polymer molecular weights, with somewhat diminished performance noted at the lowest molecular weight of 3500.

Preparation of Polymers P16–P18

Polymers P16–P18 were made in the same way as Polymer P1 except: in Polymer P16, TelomerA was substituted for MeFOSEA; and in Polymers P17–P18, CW450A and HPA respectively were substituted for CW750A. The resulting aqueous concentrate and 3% premix solutions were all fluid, relatively clear and free of any precipitate.

Examples 16–18

In Examples 16–18, Polymers P16–P18 were applied as 3% (wt) solids premix solutions to cement tiles and were evaluated for water penetration and stain resistance. Results from these tests are presented in Table 5.

TABLE 5

Results of Water and Stain Tests

| Ex. | Polymer | WAT | BFL | WIN | HBG | ATF | UMO | SSO | COF | TOTAL |
|---|---|---|---|---|---|---|---|---|---|---|
| 1 | P1 | 0/1 | 1/2 | 3/3 | 1/3 | 1/3 | 2/4 | 1/3 | 3/3 | 12/22 |
| 16 | P16 | 1/1 | 1/1 | 3/3 | 2/3 | 2/3 | 3/4 | 3/4 | 2/4 | 17/23 |
| 17 | P17 | 1/1 | 1/1 | 3/3 | 1/3 | 2/4 | 1/4 | 1/4 | 2/3 | 12/23 |
| 18 | P18 | 0/1 | 1/1 | 2/3 | 2/3 | 2/2 | 2/2 | 1/3 | 1/3 | 11/18 |

The data in Table 5 show that CW750A, CW450A and EPA polyoxyalkylene monomers all contribute comparable water barrier and stain resistance performance, indicating that significant variation in nature and molecular weight of oxyalkylene monomer is possible within the scope of this invention. Somewhat diminished performance was observed when TelomerA was substituted for MeFOSEA.

Preparation of Comparative Polymer CP3

Comparative Polymer CP3 was made in the same way as was Polymer P1 except that MeFOSEA was charged at 13.0 g, A-174 at 1.0 g, AA at 2.0 g and BA, a hydrophobic monomer, at 4.0 g. When the last portion of THF was stripped from this neutralized polymer aqueous solution, the solution became cloudier as compared to when the aqueous solution of Polymer P1 was stripped of THF, in which case the aqueous solution stayed nearly clear during the entire THF stripping process.

Preparation of Comparative Polymer CP4

Comparative Polymer CP4 was made in the same way as was Polymer P1 except that MeFOSEA was charged at 2.2 g, A-174 at 4.4 g, AA at 2.2 g and IOA, another hydrophobic monomer, at 4.0 g. When the last portion of THF was stripped from this neutralized polymer aqueous solution, the solution again became cloudier as compared to when the aqueous solution of Polymer P1 was stripped of THF.

Comparative Examples C2–C4

In Comparative Examples C2–C3, Comparative Polymers CP3 and CP4 were diluted with water to a level of 3% (wt) solids content, were applied to cement tiles as in Example 1, and half of each treated tile was evaluated for water penetration and stain resistance. Then the treated tiles were subject to the earlier described Weather-O-Meter weathering test and were remeasured for water penetration and stain resistance, as presented in Table 6. The numbers tabulated before the slash show measurements done before weathering, while the numbers tabulated after the slash show measurements after weathering.

In Comparative Example C4, the same procedure was used as with Comparative Examples C2 and C3 except that Dow™ 777 Water Repellent, a commercially available waterproofing agent consisting essentially of potassium methyl siliconate, was used instead of Comparative Polymer CP3 or CP4. Results are presented in Table 6.

Examples 19–20

In Examples 19–20, the same procedure was followed as in Comparative Examples C2 and C3 except that Polymer P1 and Polymer P18 were used respectively instead of the comparative polymers. Results are presented in Table 6.

TABLE 6

Test Results Before and After Weathering

| Ex. | Pol. | WAT | BFL | WIN | HBG | ATF | UMO | SSO | COF | TOT. |
|---|---|---|---|---|---|---|---|---|---|---|
| C2 | CP3 | 1/0 | 0/1 | 2/1 | 1/2 | 0/1 | 1/2 | 0/2 | 2/3 | 7/12 |
| C3 | CP4 | 3/3 | 0/0 | 0/1 | 0/3 | 1/2 | 1/2 | 0/3 | 3/4 | 8/18 |
| C4 | 777 | 0/1 | 0/1 | 0/0 | 4/5 | 4/5 | 4/5 | 4/5 | 3/4 | 19/26 |
| 19 | P1 | 0/0 | 0/0 | 1/1 | 1/0 | 0/0 | 1/0 | 1/0 | 0/1 | 4/2 |
| 20 | P18 | 0/0 | 0/0 | 1/1 | 0/1 | 0/1 | 0/1 | 0/1 | 2/1 | 3/6 |

The data in Table 6 show that Polymers P1 and P18, polymers of this invention, demonstrate better water penetration and stain resistance than the comparative but related treatments, both before and after weathering. It is particularly surprising that Polymers P1 and P18, containing more hydrophilic monomer-derived content, would consistently outperform Comparative Polymers CP3 and CP4, which contain more hydrophobic monomer-derived content.

Examples 21–25

As simulation tests to predict product long-term shelf life, 22% (wt) concentrate and 3% (wt) premix aqueous Polymer P1 solutions were submitted to oven aging and freeze-thaw cycle tests. The oven aging test consisted of placing samples of aqueous polymer solutions in a forced air oven adjusted to 60° C. for a period of 10 days, then removing the samples and allowing them to cool to ambient lab temperature. The freeze/thaw cycle test consisted of 10 cycles of freezing aqueous polymer solutions at −20° C. followed by thawing at 70° C. In Example 21, resistance to water penetration and staining was measured by treating cement tiles with 3% premix freshly prepared (i.e., before oven aging or freeze-thaw cycling tests) by diluting a 22% concentrate. In Examples 22 and 23, 3% premix solutions were prepared as in Example 21, except that the premix solution was oven aged or run through the freeze-thaw cycle test respectively prior to testing for resistance to water penetration and staining. In Examples 24 and 25, the 22% concentrate was oven aged or run through the freeze-thaw cycle test respectively prior to testing for resistance to water penetration and staining, then was diluted to a 3% solution for testing. In all cases, numbers before the slash represent initial water penetration or staining measurements, while numbers presented after the slash represent measurements done after scrubbing as previously described. All the test results for Examples 21–25 are presented in Table 7.

TABLE 7

| | | | Test Results Before And After Scrubbing | | | | | | | | |
|---|---|---|---|---|---|---|---|---|---|---|---|
| Ex. | % P1 | Aging Test | WAT | BFL | WIN | HBG | ATF | UMO | SSO | COF | TOT. |
| 21 | 3 | None | 0/0 | 0/2 | 1/3 | 0/2 | 1/2 | 1/3 | 0/3 | 1/1 | 4/16 |
| 22 | 3 | Oven | 1/0 | 0/1 | 1/3 | 0/2 | 0/2 | 2/3 | 0/2 | 1/1 | 5/14 |
| 23 | 3 | Frz./Thaw | 1/1 | 0/1 | 1/3 | 1/3 | 1/2 | 2/3 | 1/2 | 2/2 | 9/17 |
| 24 | 22 | Oven | 1/0 | 1/1 | 2/3 | 2/3 | 1/2 | 2/3 | 1/2 | 2/2 | 12/16 |
| 25 | 22 | Frz./Thaw | 0/0 | 1/1 | 2/3 | 2/3 | 2/2 | 2/3 | 1/2 | 1/1 | 11/15 |

The data in Table 7 show that the aged 22% concentrate and aged 3% aqueous premix solutions of Polymer P1 were only slightly worse than the unaged solution in initial resistance to water penetration and staining and showed essentially no difference in performance after one scrubbing. All solutions showed minimal cloudiness or sediment after aging, which was surprising in that the silyl groups of Polymer P1 would normally be expected to crosslink or degrade under these severe aging conditions, especially during the oven aging tests.

Example 26

The same set of aging experiments was run as in Examples 21–25 except that Polymer P1 was substituted with Polymer P19, a polymer of this invention containing no pendent silyl groups. Polymer P19 was theoretically a 64/18/18 (wt) terpolymer of MeFOSEA/AA/CW750A, made using the same procedure as used to make Polymer 1 except that MeFOSEA was charged at 12.8 g, AA at 3.6 g and CW75A at 3.6 g. Polymer P19 (containing no pendent silyl groups) gave essentially the same resistance to water penetration and staining as Polymer P1 (containing pendent silyl groups) before and after oven aging and before and after one scrubbing.

Example 27 and Comparative Examples C5–C9

The resistance of masonry treatments to particulate soiling was determined using the standard tile preparation test previously described. Cement tiles were treated with the polymer solution of each example. After each coating had dried and cured, a synthetic oily soil mixture consisting of 8% (wt) carbon black dispersed in mineral oil was applied, spread around, and ground into the treated slab surface. After 10 minutes, the panel was scrubbed with an aqueous solution of Dawn™ Dishsoap Solution using a nylon bristle scrub brush. After scrubbing, the treated surface was rated for soiling using a six point scale, where 0 represents no soiling visible after scrubbing, 5 represents no removal of soil after scrubbing, and 1, 2, 3 or 4 representing intermediate levels of soiling remaining.

In Example 27, the mortar slab was treated with a 3% premix solution of Polymer P18 prior to soiling. After scrubbing, the treated slab was given a rating of 1, indicating that only a small portion of the oily soil mixture remained.

In Comparative Example C5, the mortar slab was treated with HMK™ Silicone Impregnator S34, available from HMK Germany, a division of Europe East-West Trading Company, prior to soiling. After scrubbing, the treated slab was given a rating of 5, indicating that virtually none of the oily soil mixture had been removed.

In Comparative Example C6, the mortar slab was treated with Thompson's Water Seal™ Protector (believed to be a solution of aluminum stearate in mineral spirits) prior to soiling. After scrubbing, the treated slab was given a rating of 5, indicating that virtually none of the oily soil mixture had been removed.

In Comparative Example C7, the mortar slab was treated with Dow™ 777 Water Repellent prior to soiling. After scrubbing, the treated slab was given a rating of 5, indicating that virtually none of the oily soil mixture had been removed.

In Comparative Example C8, the mortar slab was treated with n-octyl triethoxysilane (no water, essentially a 100% solids reactive liquid) prior to soiling. After scrubbing, the treated slab was given a rating of 5, indicating that virtually none of the oily soil mixture had been removed.

In Comparative Example C9, the mortar slab was treated with 3% (wt active) of Scotchgard™ FC-3537 Fabric Protector in n-octyltriethoxysilane prior to soiling. After scrubbing, the treated slab was given a rating of 4, indicating that only a small portion of the oily soil mixture had been removed. Thus, even incorporating a good commercially used oil-repellent fabric treatment into a good commercially used water-repellent silane did not improve the silane's resistance to soiling.

Examples 28–41 and Comparative Examples C10–C23

In Examples 28–40, various masonry substrates were treated with a 3% (wt) aqueous solution of Polymer P18 at various application densities, were allowed to dry and cure, then were subjected to the standard water penetration and staining tests along with the particulate soiling test used in Example 27 (under heading of "SOIL") and to a stain test using Prestonem antifreeze (under heading of "AFZ"). In Comparative Examples C10–C22, the same water penetration and staining tests were run on the untreated masonry substrates. In Example 41, Polymer P18 was evaluated to treat southern white pine (to simulate, for instance, treating an outdoor wooden deck), while in Comparative Example C23, no treatment was used on the pine. Results of these tests are presented in Table 8. The entry "N" means that the test was not run.

TABLE 8

| Ex. | Used | (ft²/gal) | SOIL | HBG | WIN | ATF | UMO | SSO | COF | AFZ |
|---|---|---|---|---|---|---|---|---|---|---|
| 28 | White Thassos Marble | 500 | N | 0 | 0 | 0 | N | 0 | 0 | N |
| 29 | Quarry Tile | 500 | N | 0 | 0 | 0 | 0 | 0 | 0 | N |
| 30 | Gypsum Drywall | 150 | N | 0 | 2 | 0 | 0 | 0 | N | N |
| 31 | Sandstone | 150 | 1 | 2 | 1 | 1 | 0 | 0 | N | N |
| 32 | Sierra White Granite | 500 | 1 | 1 | 0 | 1 | 1 | 1 | 1 | N |
| 33 | Porcelain Tile, Textured | 500 | 0 | 0 | 0 | 0 | 0 | 0 | 0 | N |
| 34 | Honed Limestone | 500 | N | 0 | 0 | N | N | 0 | 0 | N |
| 35 | Slate | 500 | N | 0 | 0 | 0 | 0 | 0 | 0 | N |
| 36 | Red Brick, Rough Textured | 150 | 2 | N | N | N | N | N | N | N |
| 37 | Terra Cotta | 500 | 1 | 0 | 1 | 0 | 0 | 0 | 0 | N |
| 38 | Carnelian Flamed Granite | 500 | 2 | 0 | 0 | 0 | 0 | 0 | 0 | N |
| 39 | Red Brick, Smooth Face | 500 | N | 0 | N | 0 | 0 | 0 | N | N |
| 40 | Asphalt, Parking Lot | 150 | N | N | N | 0 | 0 | 0 | N | 1 |
| 41 | Southern Pine | 500 | 1 | 0 | 0 | N | 0 | 1 | 0 | N |
| C10 | White Thassos Marble | — | N | 1 | 3 | 2 | N | 1 | 3 | N |
| C11 | Quarry Tile | — | N | 4 | 2 | 4 | 4 | 2 | 2 | N |
| C12 | Gypsum Drywall | — | 4 | 4 | 4 | 5 | 4 | 5 | N | N |
| C13 | Sandstone | — | 5 | 5 | 1 | 5 | 4 | 3 | N | N |
| C14 | Sierra White Granite | — | 5 | 5 | 2 | 5 | 5 | 5 | 2 | N |
| C15 | Porcelain Tile, Textured | — | 3 | 0 | 0 | 0 | 0 | 0 | 0 | N |
| C16 | Honed Limestone | — | N | 5 | 3 | N | N | 5 | 5 | N |
| C17 | Slate | — | N | 5 | 4 | 5 | 5 | 5 | 0 | N |
| C18 | Red Brick, Rough Textured | — | 4 | N | N | N | N | N | N | N |
| C19 | Terra Cotta | — | 4 | 5 | 1 | 5 | 5 | 5 | 5 | N |
| C20 | Carnelian Flamed Granite | — | 4 | 5 | 5 | 5 | 5 | 1 | 0 | N |
| C21 | Red Brick, Smooth Face | — | N | 4 | N | 4 | 4 | 4 | N | N |
| C22 | Asphalt, Parking Lot | — | N | N | N | 5 | 5 | 5 | N | 5 |
| C23 | Southern Pine | — | 4 | 4 | 3 | N | 5 | 4 | 5 | N |

The data in Table 8 show that masonry treatments of this invention are useful for protecting a wide variety of masonry surfaces and are also usefull for protection of wood.

Example 42 and Comparative Examples C24–C27

In Example 42 and Comparative Examples C24–C27, Polymer 1 and a wide variety of water-based polymeric fluorochemical repellent emulsions were applied as 3 wt % aqueous solutions to cement tiles, were allowed to dry and cure, and then were evaluated for resistance to water penetration and staining. Scotchgard™ Fabric Protectors FC-248 and FX-1860 are hydrophilic polymers designed for release of stains and soils during laundering from soiled textiles. Scotchgard™ Fabric Protector FX-327 Fabric Protector is a hydrophobic oil and water repellent for textiles showing excellent long-term repellency. Comparative Polymer CP3 is a polymer identical in composition to Polymer P1 except that it contains n-butyl acrylate instead of hydrophilic polyoxyethylene acrylate. As before, tests were run before and after scrubbing and the corresponding results are presented before and after the slash respectively in Table 9.

The data of Table 9 show that Polymer P1 outperforms FC-248, FX-1860 and Comparative Polymer CP3. While P1 shows comparable performance to FX-327, unlike FX-327, the aqueous solution of P1 is solvent-free.

Examples 43 and 44

For Examples 43 and 44, two pieces of cotton fabric 17.8 cm by 11.4 cm were completely immersed in a 3 wt % aqueous solution of Polymer 18. The fabric of Example 43 was dried for 48 hours in an oven held at 105° C. The fabric of Example 44 was left to dry for 48 hours at room temperature.

The treated samples were evaluated for oil repellency using 3M Oil Repellency Test III (February 1994), available from 3M Company, Saint Paul, Minn. For the test, the treated samples were challenged to penetration by oils or oil mixtures of varying surface tensions. Oil and oil mixtures are given a standard rating corresponding to the following.

TABLE 9

| | | Test Results Before and After Weathering | | | | | | | | |
|---|---|---|---|---|---|---|---|---|---|---|
| Ex. | Pol. | WAT | BFL | WIN | HBG | ATF | UMO | SSO | COF | TOT. |
| 42 | P1 | 1/1 | 1/1 | 3/2 | 0/1 | 1/2 | 1/2 | 0/0 | 1/1 | 8/10 |
| C24 | FC-248 | 3/4 | 2/4 | 3/4 | 1/2 | 2/3 | 0/3 | 2/3 | 4/4 | 17/31 |
| C25 | FX-1860 | 9/9 | 2/4 | 2/3 | 2/4 | 4/4 | 0/4 | 4/4 | 4/4 | 27/34 |
| C26 | FX-327 | 0/0 | 2/2 | 3/3 | 1/2 | 0/1 | 1/0 | 0/0 | 1/1 | 8/9 |
| C27 | CP3 | 3/9 | 0/1 | 1/2 | 0/0 | 2/4 | 0/1 | 0/2 | 1/3 | 7/22 |

| Oil Repellency Rating Number | Oil Composition |
|---|---|
| 1 | mineral oil |
| 1.5 | 85/15 (vol.) mineral oil/n-hexadecane |
| 2 | 65/35 (vol.) mineral oil/n-hexadecane |
| 3 | n-hexadecane |
| 4 | n-tetradecane |
| 5 | n-dodecane |
| 6 | n-decane |

In running the test, a treated sample is placed on a flat, horizontal surface and five small drops of an oil or oil mixture are gently placed at points at least two inches apart on the surface of the sample. If, after observing for 10 seconds at a 45° angle, four of the five drops are visible as sphere or a hemisphere, the sample is deemed to pass the test for that oil or oil mixture. The reported oil repellency rating corresponds to the most penetrating oil (i.e. the highest numbered oil in the above table) for which the treated sample passes the described test.

The treated fabric samples of Examples 43 and 44 were also evaluated for water repellency using 3M Water Repellency Test V for Floorcoverings (February 1994), available from 3M Company. For this test, the treated samples were challenged to penetration by blends of deionized water and isopropyl alcohol (IPA). Each blend is given a standard rating number as shown below.

| Water Repellency Rating Number | Water/IPA Blend |
|---|---|
| 0 | 100% Water |
| 1 | 09/10 Water/IPA |
| 2 | 80/20 Water/IPA |
| 3 | 70/30 Water/IPA |
| 4 | 60/40 Water/IPA |
| 5 | 50/50 Water/IPA |
| 6 | 40/60 Water/IPA |
| 7 | 30/70 Water/IPA |
| 8 | 20/80 Water/IPA |
| 9 | 10/90 Water/IPA |
| 10 | 100% IPA |

The test is run in the same manner as the oil repellency test previously described, with the reported water repellency rating corresponding to the highest IPA-containing blend for which the treated sample passes the test. The results of the water and oil repellency tests are presented in Table 10.

TABLE 10

| Example | Oil Repellency | Water Repellency |
|---|---|---|
| 43 | 5 | 5 |
| 44 | 4 | 4 |

Example 45

Cardboard (estimated to be about 200 to 240 lb. basis) was treated with Polymer P18 and dried in an oven for 15 minutes at 65 ° C. When oil or water was placed on the surface of an untreated control sample (that was also placed in the oven), immediate wetting and absorption took place within 3 seconds. When tested on the treated surface, neither water or oil wetted the surface and no absorption occurred (i.e. no dark spots developed) even after 90 minutes, at which time the test was discontinued.

Various modifications and alterations of this invention will become apparent to those skilled in the art without departing from the scope and spirit of the present invention, and it should be understood that this invention is not to be unduly limited to the illustrative embodiments set forth hereinabove.

We claim:

1. A method for rendering a porous substrate repellent to water and oil-based stains comprising applying to the substrate a water-soluble fluorochemical polymer composition, allowing the composition to penetrate the surface of the substrate, and allowing the composition to cure on the substrate surface, said fluorochemical polymer composition consisting essentially of a fluorochemical polymer containing only carbon atoms in the backbone and comprising interpolymerized units of (a) 40 to 80 weight percent of monomers containing fluoroaliphatic groups, (b) 5 to 50 weight percent of monomers containing carboxyl groups, (c) 5 to 50 weight percent of monomers containing oxyalkylene or polyoxyalkylene groups, and (d) 1 to 20 weight percent of monomers containing silyl groups.

2. The method of claim 1 wherein the composition is heat cured.

3. The method of claim 1 wherein the substrate is selected from the group consisting of masonry, textiles, carpets, plastics, painted surfaces, and leathers.

4. The method of claim 1, wherein said fluorochemical polymer is of the formula:

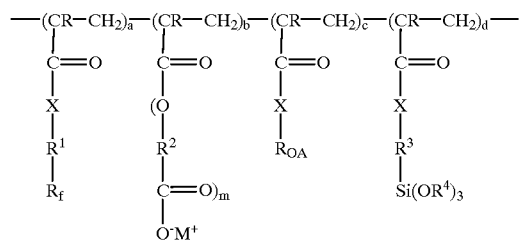

wherein:

R is hydrogen or an aliphatic group having from 1 to 4 carbon atoms;

$R_f$ is a fluoroaliphatic group having a perfluorinated carbon chain from 3 to 20 carbon atoms in length;

$R^1$ is an organic divalent connecting group;

X is independently selected from the group consisting of oxygen, nitrogen, and sulfur;

$R^2$ is a short chain alkylene group;

m is 0 or 1;

$M^+$ is a mono- or multivalent cation;

$R_{OA}$ is an oxyalkylene- or polyoxyalkylene-containing group;

$R^3$ is an organic divalent connecting group;

$R^4$ is hydrogen, or a methyl, ethyl, or butyl group; and a, b, c, and d are $\geq 1$.

5. The method of claim 4 wherein:

$R^1$ is selected from the group consisting of $-C_yH_{2y}-$, $-CON(R^5)C_yH_{2y}-$, $-SO_2N(R^5)C_yH_{2y}-$, and $-C_yH_{2y}SO_2N(R^5)C_yH_{2y}-$, where $R^5$ is hydrogen, or a methyl, ethyl, propyl, or butyl group and y is an integer equal to or between 1 and 6;

$R_{OA}$ is an oxyalkylene or a polyoxyalkylene group of the formula $-(C_2H_4O)_p(C_3H_6O)_q(C_4H_8O)_rR^6$ where $R^6$ is hydrogen or an alkyl group having from 1 to 4 carbon atoms or an aryl group and where p, q, or r can be zero, but their sum, p+q+r, must be a number greater than or equal to 1; and R³ is a —CH₂—, C₂H₄—, —C₃H₆—, or —C₄H₈— group.

6. The method of claim 4 wherein the composition is heat cured.

7. The method of claim 4 wherein the substrate is selected from the group consisting of masonry, textiles, carpets, plastics, painted surfaces, and leathers.

8. A porous substrate treated by the method of claim 4.

9. The method of claim I wherein said polymer has a number average molecular weight between about 3500 and about 30,000 and a molecular weight distribution of greater than 1.5.

10. The method of claim 9 wherein the molecular weigh distribution is greater than 2.

11. The method of claim 1 wherein said monomers containing fluoroaliphatic groups are selected from the group consisting of acrylate, methacrylate, acrylamide, methacrylamide, thioacrylate and meththioacrylate compounds containing a fluoroaliphatic moiety that is linked to the residue of the compound through a divalent, organic linking group.

12. The method of claim 1 wherein said monomers containing carboxyl groups are selected from the group consisting of acrylic acid, methacrylic acid, carboxyalkylacrylate and carboxyalkylmethacrylate compounds.

13. The method of claim 1 wherein said monomers containing oxyalkylene or polyoxyalkylene groups are selected from the group consisting of acrylate, methacrylate, acrylamide, metbacrylamide, thioacrylate and meththioacrylate compounds containing an oxyalkylene or polyoxyalkylene group linked to the residue of the compound through an oxygen, sulfur or nitrogen atom.

* * * * *